United States Patent
Fischer (10) Patent No.: US 7,083,191 B2
(45) Date of Patent: Aug. 1, 2006

(54) AIR BAG MODULE WITH VENT CONTROLLED BY TETHER

(75) Inventor: Kurt F. Fischer, Oxford, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 10/244,933

(22) Filed: Sep. 16, 2002

(65) Prior Publication Data

US 2004/0051285 A1 Mar. 18, 2004

(51) Int. Cl.
*B60R 21/26* (2006.01)
(52) U.S. Cl. .................................. 280/739; 280/743.2
(58) Field of Classification Search .............. 280/736, 280/739, 742, 743.2
See application file for complete search history.

(56) References Cited

U.S. PATENT DOCUMENTS

| | | | |
|---|---|---|---|
| 5,246,250 A | 9/1993 | Wolanin et al. ............. 280/739 |
| 5,405,166 A | 4/1995 | Rogerson ..................... 280/739 |
| 5,489,119 A | 2/1996 | Prescaro et al. |
| 5,501,488 A | 3/1996 | Saderholm et al. |
| 5,603,526 A * | 2/1997 | Buchanan ................... 280/739 |
| 5,762,367 A | 6/1998 | Wolanin |
| 5,799,974 A | 9/1998 | Honda |
| 6,017,056 A | 1/2000 | Lee |
| 6,095,557 A * | 8/2000 | Takimoto et al. ........... 280/739 |
| 6,113,134 A | 9/2000 | Lim |
| 6,131,942 A | 10/2000 | Fujii et al. |
| 6,161,866 A | 12/2000 | Ryan et al. |
| 6,206,408 B1 * | 3/2001 | Schneider ................ 280/728.1 |
| 6,371,517 B1 * | 4/2002 | Webber et al. ............. 280/736 |
| 6,648,371 B1 * | 11/2003 | Vendely et al. ............. 280/739 |
| 2001/0035638 A1 | 11/2001 | Koelsch et al. |
| 2002/0036400 A1 | 3/2002 | Winters et al. |
| 2003/0155756 A1 * | 8/2003 | Hawthorn et al. .......... 280/739 |
| 2003/0189326 A1 * | 10/2003 | Short et al. ................. 280/736 |
| 2004/0012179 A1 * | 1/2004 | Pinsenschaum et al. .... 280/739 |
| 2005/0104347 A1 | 5/2005 | Hawthorn et al. |

FOREIGN PATENT DOCUMENTS

| | | |
|---|---|---|
| DE | 4028990 | 3/1992 |
| DE | 4121039 | 1/1993 |
| DE | 19754280 | 7/1998 |
| DE | 19703945 | 8/1998 |
| DE | 19912369 | 10/2000 |
| DE | 10139626 | 3/2003 |
| DE | 10316026 | 10/2003 |

(Continued)

*Primary Examiner*—Paul N. Dickson
*Assistant Examiner*—Laura B. Rosenberg
(74) *Attorney, Agent, or Firm*—Tarolli, Sundheim, Covell & Tummino LLP.

(57) ABSTRACT

An air bag (12) is inflatable by inflation fluid. A support member (20) has a first vent opening (44) for enabling flow of inflation fluid away from the bag (12). A vent member (46) is movable relative to the first vent opening (44) between a first condition in which the vent member does not close the opening that enables flow of inflation fluid away from the bag (12) and a second condition in which the vent member at least partially blocks the flow of inflation fluid through the opening and away from the bag. A tether (50) has a first portion (52) connected for movement with the bag (12) as the bag is deployed. The tether (50) is associated with the vent member (46) and causes it to move relative to the opening (44) from the first condition to the second condition as the bag (12) is deployed.

20 Claims, 3 Drawing Sheets

FOREIGN PATENT DOCUMENTS

| | | |
|---|---|---|
| DE | 10339031 | 3/2004 |
| EP | 0332325 | 9/1989 |
| EP | 1112902 | 7/2001 |
| EP | 1165349 | 1/2002 |
| EP | 1338480 | 8/2003 |
| GB | 2338214 | 12/1999 |
| JP | 5330395 | 12/1993 |
| JP | 8507989 | 8/1996 |
| JP | 200071909 | 3/2000 |
| JP | 2001504057 | 3/2001 |
| WO | 9503953 | 2/1995 |
| WO | 9815434 | 4/1998 |
| WO | 9831570 | 7/1998 |
| WO | 03016106 | 2/2003 |
| WO | 03016106 | 3/2003 |

* cited by examiner

AIR BAG MODULE WITH VENT CONTROLLED BY TETHER

BACKGROUND OF THE INVENTION

The present invention relates to a vehicle occupant protection apparatus. In particular, the present invention relates to an air bag module having a vent that is moved between an open condition and a closed condition by a tether of an air bag.

DESCRIPTION OF RELATED ART

It is known to provide an air bag with a vent. The vent is operative, when the air bag inflates to help protect a vehicle occupant, to discharge inflation fluid from the air bag. In some air bags, the vent may be selectively opened depending on sensed factors, for example, whether the occupant's seat belt is buckled. In other air bags, such as the one shown in U.S. Pat. No. 5,405,166, the vent is formed as two openings that are initially aligned so that the vent is initially open and then closes after the internal bag pressure reaches a predetermined amount. U.S. Pat. No. 5,246,250 shows an air bag that includes a tether attached to a valve flap panel to open or close a vent opening in the air bag when the air bag is inflated and the tether is actuated.

SUMMARY OF THE INVENTION

The present invention relates to a vehicle occupant protection apparatus comprising an inflatable vehicle occupant protection device having a deflated condition and an inflated condition to which the vehicle occupant protection device is deployed by inflation fluid. A support member has a first vent opening for enabling flow of inflation fluid away from the protection device. A vent member is movable relative to the first vent opening between a first condition in which the vent member does not close the first vent opening that enables flow of inflation fluid away from the protection device and a second condition in which the vent member at least partially blocks the flow of inflation fluid through the first vent opening and away from the protection device. A tether has a first portion connected for movement with the protection device as the protection device is deployed. The tether is associated with the vent member and causes the vent member to move relative to the first vent opening from the first condition to the second condition as the protection device is deployed.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

The present invention relates to a vehicle occupant protection apparatus. In particular, the present invention relates to an air bag module having a vent that is moved between an open condition and a closed condition by a tether of an air bag.

Figure 1:
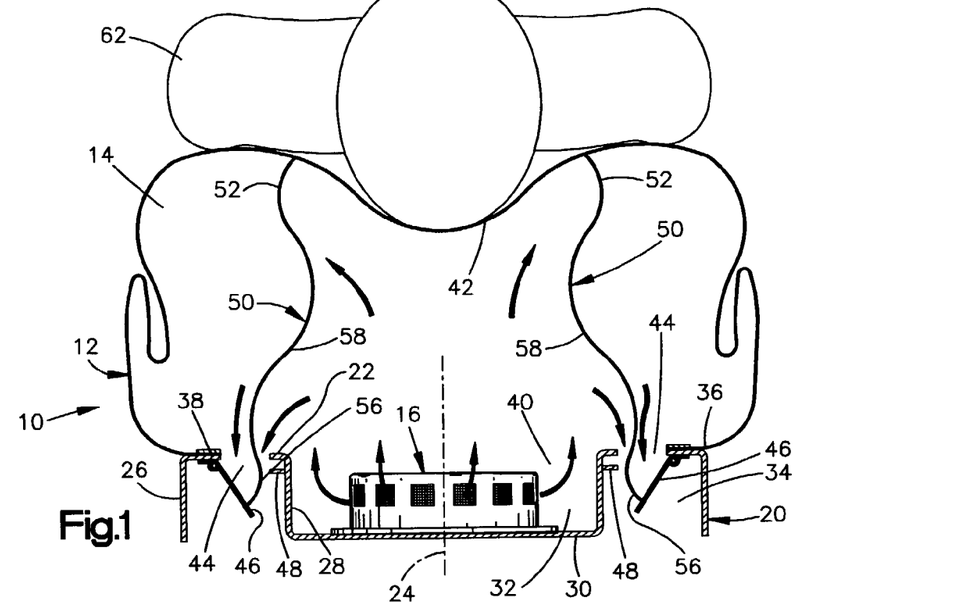
FIG. 1 is a sectional view of a portion of a vehicle occupant protection apparatus including an inflatable driver side protection device and a vent in accordance with the present invention, with the vent being open.

As representative of the invention, FIG. 1 illustrates schematically an air bag module 10 that includes an inflatable occupant protection device in the form of an air bag 12. Other vehicle occupant protection devices that can be used in accordance with the invention include, for example, inflatable seat belts, inflatable knee bolsters, inflatable head liners, inflatable side curtains, and knee bolsters operated by inflatable air bags.

The air bag 12 is preferably made from a flexible fabric material, such as woven nylon, and has an inflation fluid volume 14. The air bag 12 can alternatively be made from a non-woven material, such as plastic film. The air bag 12 has a generally pillow-shaped configuration when fully inflated and is designed for a driver-side application. The invention is applicable to air bags that are used in other locations, for example, passenger side air bags as described below with reference to FIGS. 5 and 6, or side impact air bags.

The module 10 includes an inflator 16 for inflating the air bag 12. The inflator 16 may contain a stored quantity of pressurized inflation fluid and an ignitable material for heating the inflation fluid. The module 10 alternatively could include an inflator 16 that uses the combustion of gas generating material to generate inflation fluid in the form of gas to inflate the air bag 12, or an inflator that contains only a stored quantity of pressurized inflation fluid for inflating the air bag.

The inflator 16 and the air bag 12 are supported on a support member 20. The support member 20 is a member or assembly that is fixed in position on the vehicle, that supports the inflator 16 and the air bag 12, and that receives the reaction forces of the inflator and the air bag when the inflator is actuated. In the illustrated embodiment, the support member 20 is a reaction plate.

The reaction plate 20 is a single piece of material, such as metal or high strength plastic, that is formed to the illustrated configuration. The reaction plate 20 has an annular main body portion 22 centered on an axis 24. A cylindrical rim or outer wall 26 of the reaction plate 20 extends downward (as viewed in FIG. 1) from the main body portion 22. A cylindrical inner wall 28 of the reaction plate 20 extends downward from the main body portion 22 and parallel to the outer wall 26, at a location spaced radially inward from the outer wall 26. A circular center wall 30 caps the inner wall 28.

The inner wall 28 and the center wall 30 of the reaction plate 20 define a cylindrical inflator mounting chamber 32. The inflator 16 is located in the chamber 32 and is secured to the reaction plate 20 in a manner not shown. The inner wall 28 and the outer wall 26 of the reaction plate 20 define a toroidal vent chamber 34, radially outward of the inflator mounting chamber 32.

A mouth portion 36 of the air bag 12 is secured to the main body portion 22 of the reaction plate 20 by a retainer or retainer ring 38. The mouth portion 36 defines an inflation fluid opening 40 for receiving inflation fluid from the inflator 16. The inflation fluid opening 40 allows inflation fluid to flow from the inflator 16 into the inflation fluid volume 14 of the air bag 12 when the inflator is actuated. Opposite the mouth portion 36, the air bag 12 has an outer panel 42 that is located distant from the reaction plate 20 when the air bag is inflated.

Two diametrically opposed vent openings 44 are formed in the main body portion 22 of the reaction plate 20, radially inward of the mouth portion 36 of the air bag 12. The vent openings 44 are identical to each other, each having a circular configuration. It should be understood that more than two vent openings 44 or fewer than two vent openings can be provided, and at locations different than that shown. Also, each vent opening 44 could have a configuration other than a circular configuration, and if plural vent openings are provided, they could have configurations different from each other.

Because the vent openings 44 are located in the main body portion 22 of the reaction plate 20 radially inward of the mouth portion 36 of the air bag 12, the vent openings are in fluid communication with the inflation fluid volume 14 of the air bag. As a result, at least some of the inflation fluid flowing from the inflator 16, when the inflator is actuated, flows across or into the vent openings 44 in the reaction plate 20.

The module includes two vent members 46 for selectively closing the vent openings 44. Each one of the vent members 46 is associated with a respective one of the vent openings 44. The two vent members 46 are identical in the illustrated embodiment.

Each vent member 46 is configured as a circular door that is supported on the reaction plate 20 for pivotal movement relative to the reaction plate. The door 46 is pivotally mounted to the reaction plate at a location adjacent the mouth portion 36 of the air bag 12. The module 10 includes a latch shown schematically at 48 on the inner wall 28 of the reaction plate 20, adjacent each vent opening 44. The latch 48 may be a spring loaded latch member or a bendable tab on the reaction plate 20, for example.

The door 46 has a first condition shown in FIG. 1 in which the door is spaced apart from the vent opening 44 in the reaction plate 20. When the door 46 is in the first condition, the door is pivoted away from the vent opening 44 and away from the inflation fluid volume 14 of the air bag 12 (downward as viewed in FIG. 1), into the vent chamber 34 in the reaction plate 20. When the door 46 is in the first condition, the vent opening 44 is not blocked, and inflation fluid can flow away from the air bag 12 through the vent opening.

Figure 2:
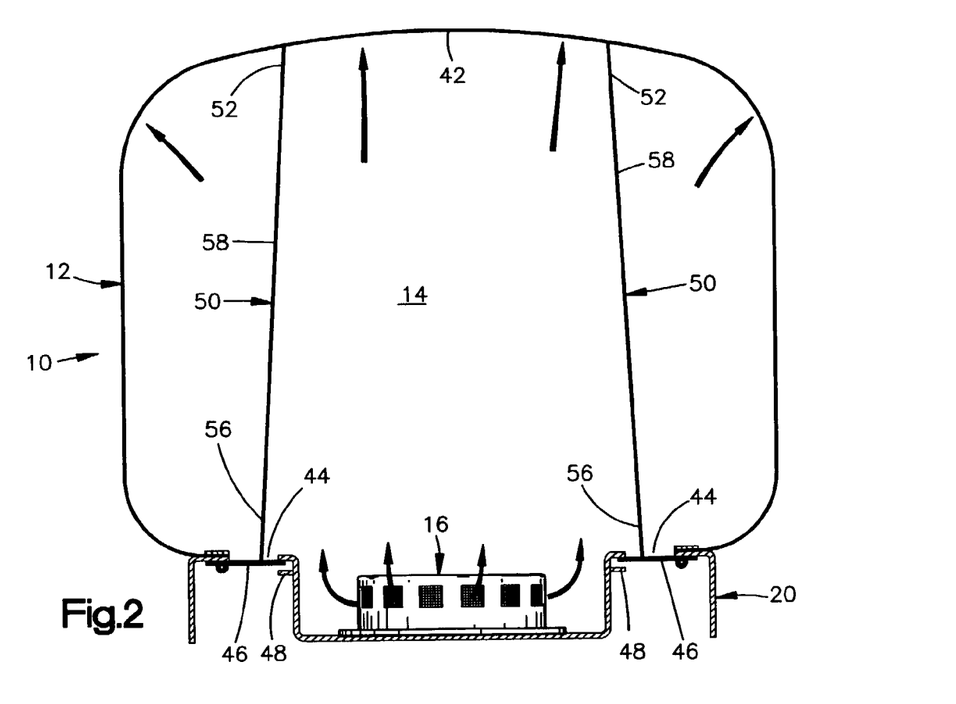
FIG. 2 is a view similar to FIG. 1 showing the protection apparatus with the vent closed.

The door 46 has a second condition shown in FIG. 2 in which the door is pivoted upward and overlies the vent opening 44 in the reaction plate. The latch 48 holds the door 46 in the second or closed condition. When the door 46 is in the second condition, the vent opening 44 is at least partially blocked and inflation fluid cannot flow away from the air bag 12 through the vent opening.

The module 10 includes one or more tethers 50 for controlling or limiting deployment of the air bag 12. In the illustrated embodiment, two identical tethers 50 are provided. Tethers 50 in accordance with the present invention may take any one of many different forms. In the illustrated embodiment, each tether 50 is a narrow, elongate piece or strip of fabric material having a width of from about one-half inch to about two inches. The tether 50 may be made from the same material as the air bag 12, or may be made from a different material. The tether 50 is not, per se, part of the air bag 12, in the sense that the air bag can deploy and inflate regardless of whether the tether is present or not.

The tether 50 has a first end portion 52 that is fixed to the outer panel 42 of the air bag 12 by sewing. The first end portion 52 of the tether 50 is thus connected for movement with the air bag 12 as the air bag is deployed.

An opposite second end portion 56 of the tether 50 is connected with or fixed to the vent door 46 for transferring tensile force from the air bag 12 and the tether 50 to the vent door. The second end portion 56 of the tether 50 may be formed as a loop that extends through or around a portion of the door 46 to couple the door for movement with the second end portion of the tether. The second end portion 56 of the tether 50 may be secured to the vent door 46 in another manner, for example, by adhesive. An intermediate portion 58 of the tether 50 extends between and interconnects the first and second end portions 52 and 56.

When the air bag 12 is in a deflated condition (not shown), the outer panel 42 of the air bag is close to or adjacent the mouth portion 36. There is a significant amount of slack in the tether 50. The slack is present because the length of the tether 50 is greater than the distance between the portion of the air bag 12 where the first end portion 52 of the tether is fixed to the outer panel 42 and the portion of the air bag 12 where the second end portion 56 of the tether is connected to the vent door 46, when the air bag is in the deflated condition. In the illustrated embodiment, the slack is provided by the intermediate portion 58 of the tether 50. Because of the presence of the slack, the vent doors 46 are not pulled closed against the reaction plate 20 when the air bag 12 is in the deflated condition, and inflation fluid may be able to flow away from the air bag through the vent openings 44.

If the air bag 12 is to be inflated, an actuation signal is transmitted to the inflator 16. When the inflator 16 is actuated, it emits a large volume of inflation fluid through the mouth portion 36 of the air bag 12 and into the inflation fluid volume 14 of the air bag. The air bag 12 inflates, as shown in FIGS. 1 and 2.

As the air bag 12 inflates, the outer panel 42 of the air bag moves away from the reaction plate 20 and the vent doors 46. If the air bag 12 inflates by less than a certain amount (FIG. 1), the outer panel 42 moves away from the reaction plate 20 by less than a predetermined distance. This might happen, for example, if the air bag 12 when inflating contacts a vehicle occupant (as shown schematically at 62 in FIG. 1) positioned relatively close to the reaction plate 20.

The engagement of the air bag 12 with the relatively close vehicle occupant 62 stops or limits outward movement of the outer panel 42 of the air bag. When this occurs, the tethers 50 are not stretched out sufficiently to remove the slack from the tethers. The tethers 50 do not pull on the vent doors 46, and the vent doors remain in the first condition, spaced apart from the vent openings 44. The vent openings 44 remain open, enabling flow of inflation fluid away from the air bag 12 through the vent openings. This venting of the air bag 12 can reduce the force and pressure with which the air bag inflates.

If the air bag 12 inflates by more than a certain amount (FIG. 2), the outer panel 42 moves away from the reaction plate 20 by a predetermined amount. Such movement might occur if the air bag 12 inflates fully to help protect a vehicle occupant seated against the vehicle seat back. This movement of the outer panel 42 away from the reaction plate 20 by the predetermined amount causes the tethers 50 to be tensioned, as shown in FIG. 2. The distance between the first end portions 52 of the tethers 50 and the second end portions 56 of the tethers increases. The slack is pulled out of the tethers 50 and the tethers pull the vent doors 46 into the second condition or closed condition shown in FIG. 2. The vent openings 44 are closed, blocking flow of inflation fluid away from the air bag 12 through the vent openings. The latches 48 hold the vent doors 46 closed. The air bag 12 inflates with full force and pressure.

Figure 3:
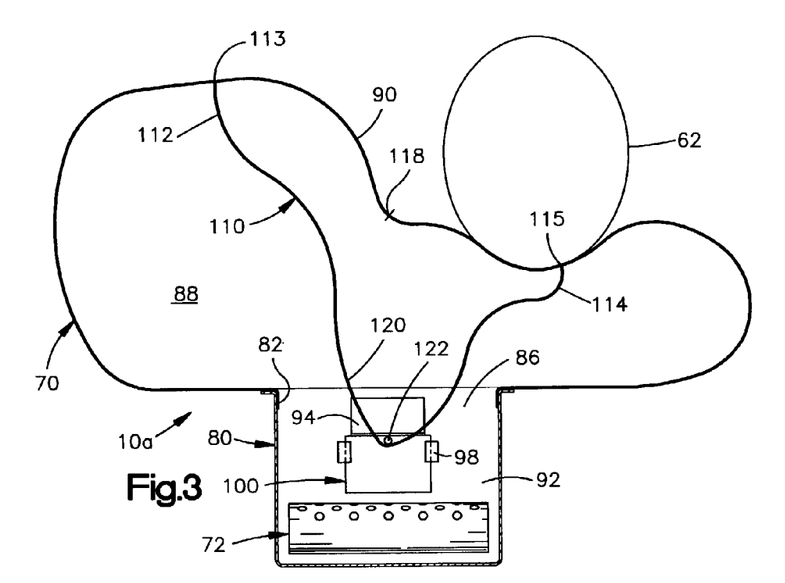
FIG. 3 is a sectional view of a portion of a vehicle occupant protection apparatus and a vent in accordance with a second embodiment of the present invention, with the vent being open.
Figure 4:
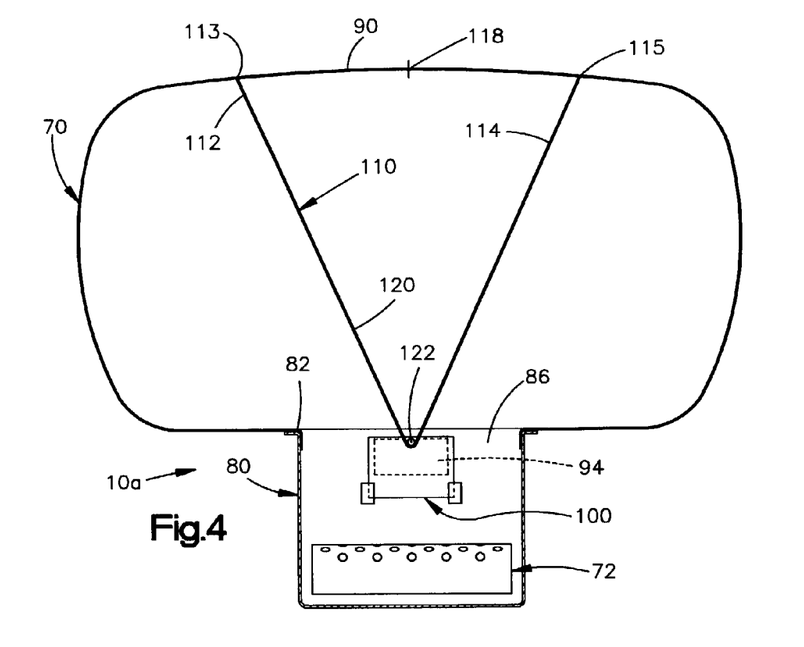
FIG. 4 is a view similar to FIG. 3 showing the protection apparatus with the vent closed.

FIGS. 3 and 4 illustrate an air bag module 10a in accordance with a second embodiment of the invention. The air bag module 10a is a passenger side frontal air bag module that includes an air bag 70 and an inflator 72 for inflating the air bag. The air bag 70 and the inflator 72 are mounted on a support member 80. In the illustrated embodiment, the support member 80 is a reaction canister mounted in a vehicle instrument panel. The reaction canister 80 could alternatively be part of the instrument panel itself.

A mouth portion 82 of the air bag 70 is secured to the reaction canister 80. The mouth portion 82 defines an inflation fluid opening 86 for receiving inflation fluid from the inflator 72. The inflation fluid opening 86 allows inflation fluid to flow from the inflator 72 into an inflation fluid volume 88 of the air bag 70 when the inflator 72 is actuated. Opposite the mouth portion 82, the air bag 70 has an outer panel 90 that is located distant from the reaction canister 80 when the air bag is inflated.

The reaction canister 80 as shown has a bottom wall 92 that defines a vent opening 94. The vent opening 94 is in fluid communication with the inflation fluid volume 88 of the air bag 70. A door retainer 98 is fixed to the reaction canister 80 adjacent the vent opening 94.

The module 10a includes a vent member 100 for selectively closing the vent opening 94. The vent member 100 is formed as a door supported on the reaction canister 80 at a location adjacent the vent opening 94. The door 100 is supported on the reaction canister 80 for sliding movement relative to the reaction canister. The door retainer 98 and the bottom wall 92 of the reaction canister 80 cooperate to guide the sliding movement of the door 100.

The door 100 has a first condition shown in FIG. 3 in which the door is spaced apart from the vent opening 94 in the reaction canister 80. When the door 100 is in the first condition, the vent opening 94 in the reaction canister 80 is not blocked, and inflation fluid can flow away from the air bag 70 through the vent opening.

The door 100 has a second condition shown in FIG. 4 in which the door overlies the vent opening 94 in the reaction canister 80. When the door 100 is in the second condition, the vent opening 94 is blocked and inflation fluid can not flow away from the air bag 70 through the vent opening.

The apparatus 10a includes one or more tethers 110 for controlling operation of the vent door 100. In the illustrated embodiment, only one tether 110 is used. The tether 110 has a first part or first end portion 112 that is fixed to a first portion 113 of the outer panel 90 of the air bag 70. An opposite second part or second end portion 114 of the tether 110 is fixed to a second portion 115 of the outer panel 90. Both the first and second portions 113 and 115 of the air bag 70 are offset laterally from the center point 118 of the outer panel 90.

An intermediate portion 120 of the tether 110 extends around a pin 122 or other portion of the vent door 100. The tether 110 may also extend through a tether guide (not shown) fixed to the reaction canister 80. The intermediate portion 120 of the tether 110 is freely slidable relative to the vent door 100 in response to forces applied to one or both end portions 112 and 114 of the tether. As the intermediate portion 120 of the tether 110 moves relative to the vent door 100, the distance between the first end portion 112 of the tether and the vent door varies in inverse relationship to the distance between the second end portion 114 of the tether and the vent door.

When the air bag 70 is in a deflated condition (not shown), the outer panel 90 of the air bag is close to or adjacent the mouth portion 82. There is a significant amount of slack in the tether 110. The vent door 100 is in the first condition as shown in FIG. 3, in which the vent door does not cover the vent opening 94 in the reaction canister. As a result, inflation fluid may be able to flow away from the air bag 70 through the vent opening 94.

When the air bag 70 is inflated, the outer panel 90 of the air bag moves away from the reaction canister 80 and the vent door 100. The first and second end portions 112 and 114 of the tether 110 also move away from the vent door 100.

The air bag 70 might inflate fully without contacting a vehicle occupant or other object during inflation. In that situation, as shown in FIG. 4, the entire outer panel 90 moves fully away from the vent door 100, carrying with it both the first end portion 112 and the second end portion 114 of the tether 110. Each of the first and second end portions 112 and 114 of the tether 110 moves away from the vent door 100 by a substantial distance. As a result of this movement, the combined distances between (a) the first end portion 112 of the tether 110 and the vent door 100 and (b) the second end portion 114 of the tether and the vent door 100 substantially equal the length of the tether 110 between the first and second end portions. The tether 110 is, therefore, stretched out sufficiently to remove its slack.

The tightened tether 110, through the intermediate portion 120 of the tether, pulls on the pin 122. The vent door 100 is pulled from the first condition to the second condition in which it covers the vent opening 94 in the reaction canister 80. The vent opening 94 in the reaction canister 80 closes, blocking flow of inflation fluid away from the air bag 70 through the vent opening. The air bag 70 inflates with full force and pressure.

The inflating air bag 70 might, alternatively, contact a vehicle occupant positioned relatively close to the reaction canister 80 and centered laterally relative to the reaction canister. If this occurs, the engagement of the air bag 70 with the vehicle occupant stops or limits outward movement of the outer panel 90 of the air bag. If the combined distances between (a) the first end portion 112 of the tether 110 and the vent door 100 and (b) the second end portion 114 of the tether and the vent door substantially equal the length of the tether between the first and second end portions, as described above, then the tether is stretched out sufficiently to remove its slack. The vent door 100 is moved from the open condition to the closed condition, blocking flow of inflation fluid away from the air bag 70 through the vent opening 94.

In another alternative deployment scenario, the combined distances between (a) the first end portion 112 of the tether 110 and the vent door 100 and (b) the second end portion 114 of the tether and the vent door might not substantially equal the length of the tether between the first and second end portions. In this case, the tether 110 is not stretched out sufficiently to remove its slack. The tether 110 does not exert sufficient force on the vent door 100 to move the vent door from the first condition to the second condition.

An example of this deployment scenario is shown in FIG. 3. Even though a portion of the outer panel 90 has moved fully away from the vent door 100, carrying with it the first end portion 112 of the tether 110, the second end portion 114 of the tether remains relatively close to the vent door because of contact with a vehicle occupant 62. Because the intermediate portion 120 of the tether 110 is slidable about the pin 122 of the vent door 100, the movement of the first end portion 112 of the tether away from the vent door causes the distance between the first end portion 112 and the vent door to increase and the distance between the second end portion 114 and the vent door to decrease. The distance between the first end portion 112 of the tether 100 and the vent door 100 varies in inverse relationship to the distance between the second end portion 114 of the tether and the vent door. The movement of the tether 110 therefore does not cause the tether to be tensioned sufficiently to move the vent door. The vent opening 94 remains uncovered, enabling venting of inflation fluid away from the air bag 70.

The tether 110 is thus operative to cause the vent door 100 to move so as to close the vent opening 94, only in response to movement of the first and second tether end portions 112 and 114 away from the vent door by a combined amount in excess of a predetermined amount. That is, the vent door 100 is closed only when the air bag 70 is deployed in a manner such that the combined distances between (a) the first part 112 of the tether 100 and the vent door and between (b) the second part 114 of the tether and the vent door substantially equal the length of the tether between the first and second parts 112 and 114.

Figure 5:
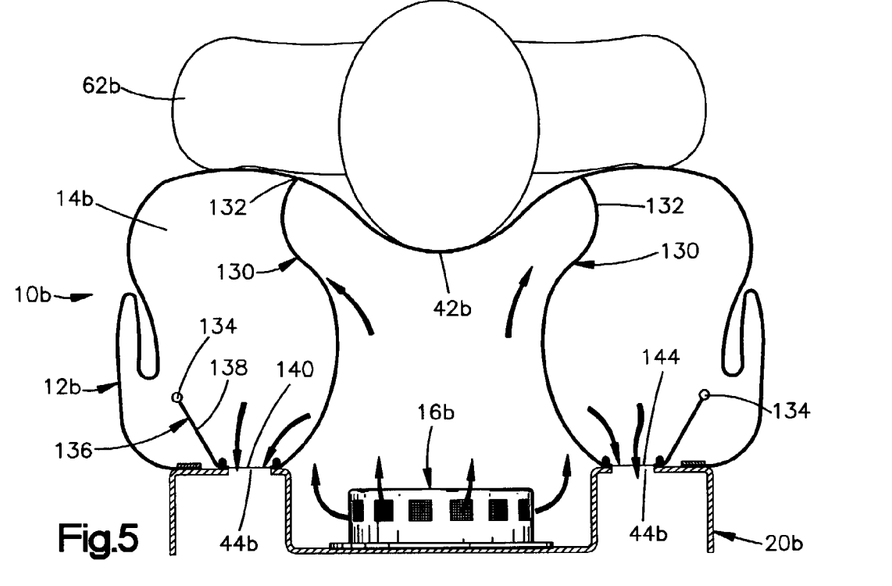
FIG. 5 is a sectional view of a portion of a vehicle occupant protection apparatus including an inflatable passenger side protection device and a vent in accordance with a third embodiment of the present invention, with the vent being open.
Figure 6:
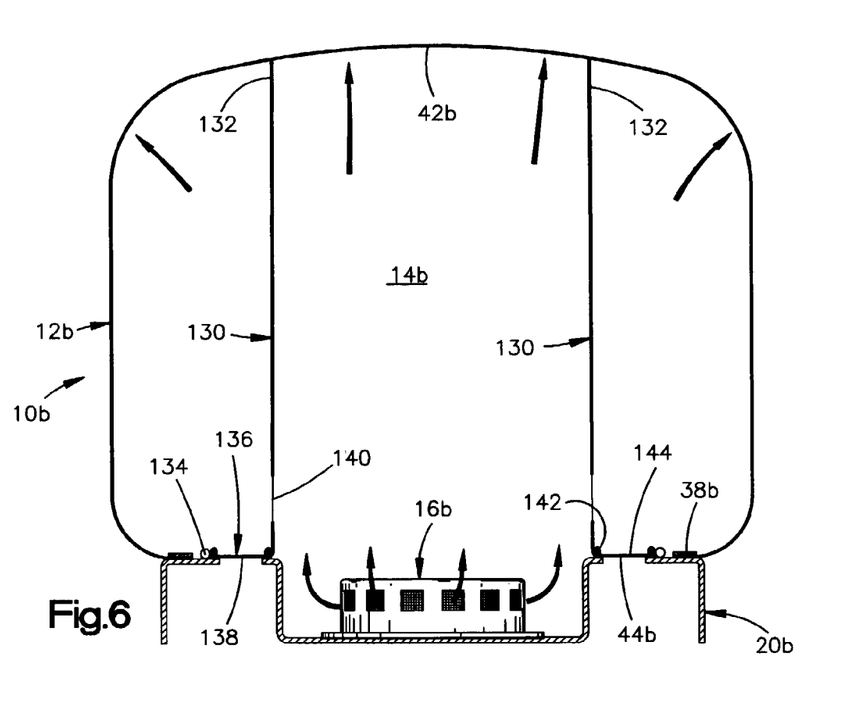
FIG. 6 is a view similar to FIG. 5 showing the protection apparatus with the vent closed.

FIGS. 5 and 6 illustrate an air bag module 10b in accordance with a third embodiment of the invention. Portions of the air bag module 10b that are the same as or similar to corresponding portions of the air bag module 10 (FIGS. 1–2) are given the same reference numerals with the suffix "b" added.

The module 30b includes an air bag 12b and two identical tethers 130. Each tether 130 has a first end portion 132 that is fixed to the outer panel 42b of the air bag 12b by sewing. An opposite second end portion 134 of each tether 130 is formed as a stop member. Adjacent each stop member 134 is a vent member 136. The vent member 136 includes a solid tether portion 138 and a vent opening 140.

The vent member 136 may be formed as one piece with the tether 130, as shown in FIGS. 5 and 6, including the first end portion 132 and the stop member 134. Alternatively, the vent member 136 may be formed as a separate member attached to the tether 130.

The module 10b includes a tether retainer 142 fixed to the reaction plate 20b, overlying the vent opening 44b in the reaction plate. The tether retainer 142 includes a third vent opening 144 that is aligned with the vent opening 44b in the reaction plate 20b. The vent member 136 is slidable through the tether retainer 142, relative to the reaction plate 20b.

When the air bag 12b is in a deflated condition (not shown), the outer panel 42b of the air bag is close to or adjacent the reaction plate 20b. There is a significant amount of slack in the tethers 130. The vent openings 140 in the vent members 136 are aligned with the vent openings 44b in the reaction plate 20b. As a result, inflation fluid may be able to flow away from the air bag 12b through the vent openings 44b.

When the air bag 12b is inflated, the outer panel 42b of the air bag moves away from the reaction plate 20b and the vent openings 44b. If the air bag 12b inflates by less than a certain amount (FIG. 5), the outer panel 42b moves away from the reaction plate 20b by less than a predetermined amount. This might happen, for example, if the air bag 12b when inflating contacts a vehicle occupant (as shown schematically at 62b in FIG. 5) positioned relatively close to the reaction plate 20b.

The engagement of the air bag 12b with the vehicle occupant 62b stops or limits outward movement of the outer panel 42b of the air bag. The tethers 130 are not stretched out sufficiently to remove the slack from the tethers. The tethers 130 do not pull the vent members 136 through the tether retainer 142, and the vent members 136 remain in the first condition. The vent openings 140 in the vent members 136 are aligned with the vent openings 44b in the reaction plate 20b, enabling flow of inflation fluid away from the air bag 12b through the vent openings. This venting of the air bag 12b can reduce the force and pressure with which the air bag inflates.

If the air bag 12b inflates by more than a certain amount (FIG. 6), the outer panel 42b moves away from the reaction plate 20b by a predetermined amount. Such movement might occur if the air bag inflates fully to help protect a vehicle occupant seated against the vehicle seat back. This movement of the outer panel 42b away from the reaction plate 20b by the predetermined amount causes the tethers 130 to be tensioned, as shown in FIG. 6. The slack is pulled out of the tethers 130. The vent members 136 are pulled through the tether retainer 142 to a second condition in which the vent members 136 overlie the vent openings 44b in the reaction plate 20b. The vent openings 44b are closed, blocking flow of inflation fluid away from the air bag 12b through the vent openings. The air bag 12b inflates with full force and pressure.

From the above description of the invention, those skilled in the art will perceive improvements, changes and modifications in the invention. Such improvements, changes and modifications within the skill of the art are intended to be covered by the appended claims.

Having described the invention, I claim:

1. A vehicle occupant protection apparatus comprising:
   an inflatable vehicle occupant protection device having a deflated condition and an inflated condition to which said vehicle occupant protection device is deployed by inflation fluid;
   a support member having a first vent opening for enabling flow of inflation fluid away from said protection device;
   a vent member movable relative to said first vent opening between a first condition in which said vent member does not close said first vent opening that enables flow of inflation fluid away from said protection device and a second condition in which said vent member at least partially blocks said flow of inflation fluid through said first vent opening and away from said protection device;
   a tether having a first portion connected for movement with said protection device as said protection device is deployed;
   said tether being associated with said vent member and causing said vent member to move relative to said first vent opening from the first condition to the second condition as said protection device is deployed,
   wherein said vent member is a door supported for pivotal movement relative to said first vent opening between the first and second conditions.

2. Apparatus as set forth in claim 1 wherein said tether is a fabric strap.

3. Apparatus as set forth in claim 2 wherein said tether has a second portion connected with said door for transferring tensile force from said protection device to said door as said protection device is deployed.

4. Apparatus as set forth in claim 1 wherein said tether causes said vent member to move relative to said first vent opening from the first condition to the second condition to close said first vent opening only in response to movement of said first portion of said tether and a second portion of said tether away from said vent door by a combined amount in excess of a predetermined amount.

5. Apparatus as set forth in claim 1 wherein said tether has slack when said protection device is in a deflated condition due to the length of said tether being greater than the distance between its opposite ends when said protection device is in the deflated condition, said tether being tensioned upon inflation of said protection device beyond a predetermined amount to remove said slack from said tether to cause said vent member to move relative to said first vent opening from the first condition to the second condition to close said first vent opening.

6. A vehicle occupant protection apparatus comprising:
an inflatable vehicle occupant protection device having a deflated condition and an inflated condition to which said vehicle occupant protection device is deployed by inflation fluid;
a support member having a first vent opening for enabling flow of inflation fluid away from said protection device;
a vent member movable relative to said first vent opening between a first condition in which said vent member does not close said first vent opening that enables flow of inflation fluid away from said protection device and a second condition in which said vent member at least partially blocks said flow of inflation fluid through said first vent opening and away from said protection device;
a tether having a first portion connected for movement with said protection device as said protection device is deployed;
said tether being associated with said vent member and causing said vent member to move relative to said first vent opening from the first condition to the second condition as said protection device is deployed,
wherein said vent member is a door supported for pivotal movement relative to said first vent opening between the first and second conditions,
a latch cooperating with said door for maintaining said door in the second condition when said protection device is deployed.

7. A vehicle occupant protection apparatus comprising:
an inflatable vehicle occupant protection device having a deflated condition and an inflated condition to which said vehicle occupant protection device is deployed by inflation fluid;
a support member having a first vent opening for enabling flow of inflation fluid away from said protection device;
a vent member movable relative to said first vent opening between a first condition in which said vent member does not close said first vent opening that enables flow of inflation fluid away from said protection device and a second condition in which said vent member at least partially blocks said flow of inflation fluid through said first vent opening and away from said protection device;
a tether having a first portion connected for movement with said protection device as said protection device is deployed;
said tether being associated with said vent member and causing said vent member to move relative to said first vent opening from the first condition to the second condition as said protection device is deployed,
wherein said tether and said vent member are portions of a single fabric strap.

8. Apparatus as set forth in claim 7 wherein said fabric strap has a second vent opening, said second vent opening being aligned with said first vent opening when said vent member is in the first condition to enable fluid flow from said protection device through said first vent opening, said second vent opening being spaced apart from said first vent opening when said vent member is in the second condition to block fluid flow from said protection device through said first vent opening.

9. Apparatus as set forth in claim 8 wherein said second vent opening is movable relative to said first vent opening between a first position when said device is in the deflated condition in which said second vent opening is aligned with said first vent opening, and a second position when said device is in the inflated condition in which said second vent opening is not aligned with said first vent opening.

10. A vehicle occupant protection apparatus comprising:
an inflatable vehicle occupant protection device having a deflated condition and an inflated condition to which said vehicle occupant protection device is deployed by inflation fluid;
a support member having a first vent opening for enabling flow of inflation fluid away from said protection device;
a vent member movable relative to said first vent opening between a first condition in which said vent member does not close said first vent opening that enables flow of inflation fluid away from said protection device and a second condition in which said vent member at least partially blocks said flow of inflation fluid through said first vent opening and away from said protection device;
a tether having a first portion connected for movement with said protection device as said protection device is deployed;
said tether being associated with said vent member and causing said vent member to move relative to said first vent opening from the first condition to the second condition as said protection device is deployed,
wherein said first portion of said tether includes a first part of said tether connected for movement with said protection device at a first location and a second part of said tether connected for movement with said protection device at a second location spaced apart from said first location;
said first and second parts of said tether moving away from said vent member upon inflation of said protection device,
said tether causing said vent member to move relative to said first vent opening from the first condition to the second condition when said protection device is deployed in a manner that the combined distances between said first part of said tether and said vent member and between said second part of said tether and said vent member substantially equal the length of said tether between said first and second parts.

11. Apparatus as set forth in claim 10 wherein said tether has an intermediate portion between said first and second parts that is movable around a portion of said vent member to vary the distance between said first part of said tether and said vent member in inverse relationship to the distance between said second part of said tether and said vent member.

12. A vehicle occupant protection apparatus comprising:
an inflatable vehicle occupant protection device;
an inflator that is actuatable for providing inflation fluid for inflating the protection device;
a support member for supporting the inflator and the protection device, the support member having first and second vent openings;
a first mechanism associated with the first vent opening and including a first vent member and a first tether, the first tether extending between the protection device and the first vent member and, when tensioned during inflation of the protection device, moving the first vent member from a first condition, in which inflation fluid may flow through the first vent opening, toward a second condition, in which the first vent member prevents inflation fluid from flowing through the first vent opening; and
a second mechanism associated with the second vent opening and including a second vent member and a second tether, the second tether extending between the protection device and the second vent member and, when tensioned during inflation of the protection device, moving the second vent member from a first condition, in which inflation fluid may flow through the second vent opening, toward a second condition, in which the second vent member prevents inflation fluid from flowing through the second vent opening,
the first and second mechanisms operating independently of one another.

13. Apparatus set forth in claim 12 wherein the first and second vent openings are located on diametrically opposite sides of the inflator.

14. A vehicle occupant protection apparatus comprising:
an inflatable vehicle occupant protection device;
an inflator that is actuatable for providing inflation fluid for inflating the protection device;
a support member for supporting the inflator and the protection device, the support member having first and second vent openings;
a first mechanism associated with the first vent opening and including a first vent member and a first tether, the first tether extending between the protection device and the first vent member and, when tensioned during inflation of the protection device, moving the first vent member from a first condition, in which inflation fluid may flow through the first vent opening, toward a second condition, in which the first vent member prevents inflation fluid from flowing through the first vent opening; and
a second mechanism associated with the second vent opening and including a second vent member and a second tether, the second tether extending between the protection device and the second vent member and, when tensioned during inflation of the protection device, moving the second vent member from a first condition, in which inflation fluid may flow through the second vent opening, toward a second condition, in which the second vent member prevents inflation fluid from flowing through the second vent opening,
the first and second mechanisms operating independently of one another,
wherein the first and second vent openings are located on a common surface of the support member.

15. A vehicle occupant protection apparatus comprising:
an inflatable vehicle occupant protection device;
an inflator that is actuatable for providing inflation fluid for inflating the protection device;
a support member having a vent opening;
a vent member having a first portion that is fixed relative to the support member and a rigid second portion that is movable relative to the support member between a first condition in which inflation fluid may flow through the vent opening and a second condition in which the rigid second portion of the vent member closes the vent opening for blocking a flow of inflation fluid through the vent opening;
a tether extending between the protection device and the rigid second portion of the vent member and causing the rigid second portion of the vent member to move from the first condition toward the second condition as the protection device is inflated.

16. Apparatus as set forth in claim 15 wherein the rigid second portion of the vent member pivots relative to the first portion of the vent member during movement from the first condition toward the second condition.

17. Apparatus as set forth in claim 15 wherein the rigid second portion of the vent member, when the vent member is in the first condition, is spaced away from the support member.

18. A vehicle occupant protection apparatus comprising:
an inflatable vehicle occupant protection device;
an inflator that is actuatable for providing inflation fluid for inflating the protection device;
a support member for supporting the inflator and the protection device, the support member having a vent opening through which inflation fluid may flow, a flow of inflation fluid through the vent opening being in a first direction relative to the support member, the support member also having a wall that is located between the inflator and the vent opening, the wall directing inflation fluid provided by the inflator toward the protection device, a flow of inflation fluid from the inflator toward the protection device being in a second direction opposite the first direction and generally parallel to the first direction;
a vent member located on an opposite side of the support member from the protection device when the protection device is in the deflated condition and being associated with the vent opening, the vent member having a first condition in which inflation fluid may flow through the vent opening and a second condition in which the vent member blocks a flow of inflation fluid through the vent opening; and
a tether extending between the protection device and the vent member, tension in the tether caused by inflation of the protection device moving the vent member from the first condition toward the second condition.

19. Apparatus as set forth in claim 18 wherein at least a portion of the vent member moves in the second direction during movement of the vent member from the first condition toward the second condition.

20. Apparatus as set forth in claim 18 further including a retainer for securing the protection device relative to the support member.

* * * * *